(12) United States Patent
Lin et al.

(10) Patent No.: US 11,140,316 B2
(45) Date of Patent: Oct. 5, 2021

(54) PROJECTION METHOD AND PROJECTOR USING THEREOF

(71) Applicant: ASUSTeK COMPUTER INC., Taipei (TW)

(72) Inventors: Yu-Sheng Lin, Taipei (TW); Yaw-Huei Chiou, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 226 days.

(21) Appl. No.: 16/564,081

(22) Filed: Sep. 9, 2019

(65) Prior Publication Data

US 2020/0092469 A1  Mar. 19, 2020

(30) Foreign Application Priority Data

Sep. 13, 2018 (TW) ................... 107132315

(51) Int. Cl.
*H04N 9/31* (2006.01)
*G03B 21/14* (2006.01)
*H04N 5/232* (2006.01)

(52) U.S. Cl.
CPC ....... *H04N 5/23232* (2013.01); *G03B 21/142* (2013.01); *H04N 9/3126* (2013.01); *H04N 9/3188* (2013.01)

(58) Field of Classification Search
CPC .... H04N 5/23232; H04N 5/2355; H04N 9/31; H04N 9/3179; H04N 9/3188; H04N 9/3105; H04N 9/3152; H04N 9/3126; G03B 21/14; G03B 21/142
See application file for complete search history.

(56) References Cited

U.S. PATENT DOCUMENTS

| | | | |
|---|---|---|---|
| 10,205,923 B2 | 2/2019 | Xiao et al. | |
| 10,306,192 B2* | 5/2019 | Okita | H04N 9/04557 |
| 2005/0140934 A1 | 6/2005 | Seo et al. | |
| 2017/0187998 A1* | 6/2017 | Xiao | H04N 9/3141 |
| 2019/0297308 A1* | 9/2019 | Yang | H04N 7/0127 |
| 2020/0272034 A1* | 8/2020 | Lin | G03B 21/142 |
| 2021/0049976 A1* | 2/2021 | Chang | H04N 7/0132 |
| 2021/0076015 A1* | 3/2021 | Hosaka | G09G 3/2003 |

FOREIGN PATENT DOCUMENTS

| | | |
|---|---|---|
| CN | 1997937 A | 7/2007 |
| CN | 105376501 A | 3/2016 |
| CN | 106385575 A | 2/2017 |
| CN | 106507075 A | 3/2017 |
| CN | 107820068 A | 3/2018 |

* cited by examiner

*Primary Examiner* — William C. Dowling
(74) *Attorney, Agent, or Firm* — McClure, Qualey & Rodack, LLP

(57) ABSTRACT

A projection method is provided. The projection method comprises the steps of identifying the resolution of an original image, comparing the resolution of the original image with a preset resolution to generate a comparison result, determining whether to deflect a projection lens in a projection process according to the comparison result, and projecting at least one image in the projection process according to the comparison result.

11 Claims, 8 Drawing Sheets

PROJECTION METHOD AND PROJECTOR USING THEREOF

CROSS-REFERENCE TO RELATED APPLICATION

This application claims the priority benefit of Taiwan Application Serial No. 107132315, filed on Sep. 13, 2018. The entirety of the above-mentioned patent application is hereby incorporated by reference herein and made a part of specification.

BACKGROUND OF THE INVENTION

Field of the Invention

The disclosure relates to a projection method and a projector.

Description of the Related Art

With the rapid development of display technology, 4K resolution images (i.e., images with the resolution of 3840× 2160) are increasingly popular. However, the projection pixels of a common projector do not reach a 4K resolution, and therefore fail to directly project 4K resolution images. Therefore, the conventional projector converts an original image having the resolution equal to or lower than 4K into multiple images having the same resolution as a projection lens, and then these low-resolution images are projected with a high frame rate by means of pixel shift, so that when human eyes watch these low-resolution images on a projection screen, the watching experience of 4K images is generated due to the visual persistence. However, such an image processing method decreases the image quality.

BRIEF SUMMARY OF THE INVENTION

According to the first aspect of the disclosure, a projection method is provided. The projection method comprises following steps: identifying the resolution of an original image, comparing the resolution of the original image with a preset resolution to generate a comparison result, determining whether to deflect a projection lens in a projection process according to the comparison result, and projecting at least one image in the projection process according to the comparison result.

According to the second aspect of the disclosure, a projector is provided. The projector comprises a projection lens, a lens deflector, a resolution identification unit, a comparison unit and an actuator. The lens deflector is electrically connected with the projection lens and configured to deflect the projection lens. The resolution identification unit is configured to identify the resolution of an original image. The comparison unit is coupled to the resolution identification unit and configured to compare the resolution of the original image with a preset resolution to generate a comparison result. The actuator is coupled to the lens deflector and configured to actuate the lens deflector when the comparison unit determines that the resolution of the original image is higher than the preset resolution, and the actuator is further configured to not actuate the lens deflector when the comparison unit determines that the resolution of the original image is lower than or equal to the preset resolution.

From the above embodiments, the projector and the projection method provided by the disclosure firstly compare the resolution of the original image with the preset resolution, and then determine whether to deflect the lens in the projection process according to the comparison result. That is to say, such a projection method determines whether to project images by means of pixel shift based on the resolution. In this way, when the resolution of the original image is lower than the preset resolution (e.g., 4K resolution, or any resolution between 4K resolution and full HD resolution), the projector determines not to project images by means of pixel shift, and the original image does not need to be converted into a 4K image, thereby avoiding some image quality defects (e.g., distortion or deformation, etc.) generated when the original image is converted into a 4K image and the 4K image is subsequently segmented into 4 frame images.

DETAILED DESCRIPTION OF THE EMBODIMENTS

To better understand the aspects of the disclosure, the following is a detailed description of the embodiments with reference to the accompanying drawings, which are not intended to limit the scope of the disclosure, and the description of the operation of the structure is not intended to limit the order of execution thereof. Any device with the same effects shall fall within the disclosure as long as its structure is merely recombination of components described herein.

As used herein, a plurality of elements, when referred to as "connected" or "coupled," may refer to "electrically connected" or "electrically coupled," that is, transmission of electrical signals exist between these elements. Furthermore, although terms such as "first" and "second" are used to describe different elements herein, the terms are only intended to distinguish elements or operations described with same technical terms. Unless the context clearly indicates otherwise, the terms neither indicate or imply a sequence or an order, nor limit the disclosure.

Figure 1:
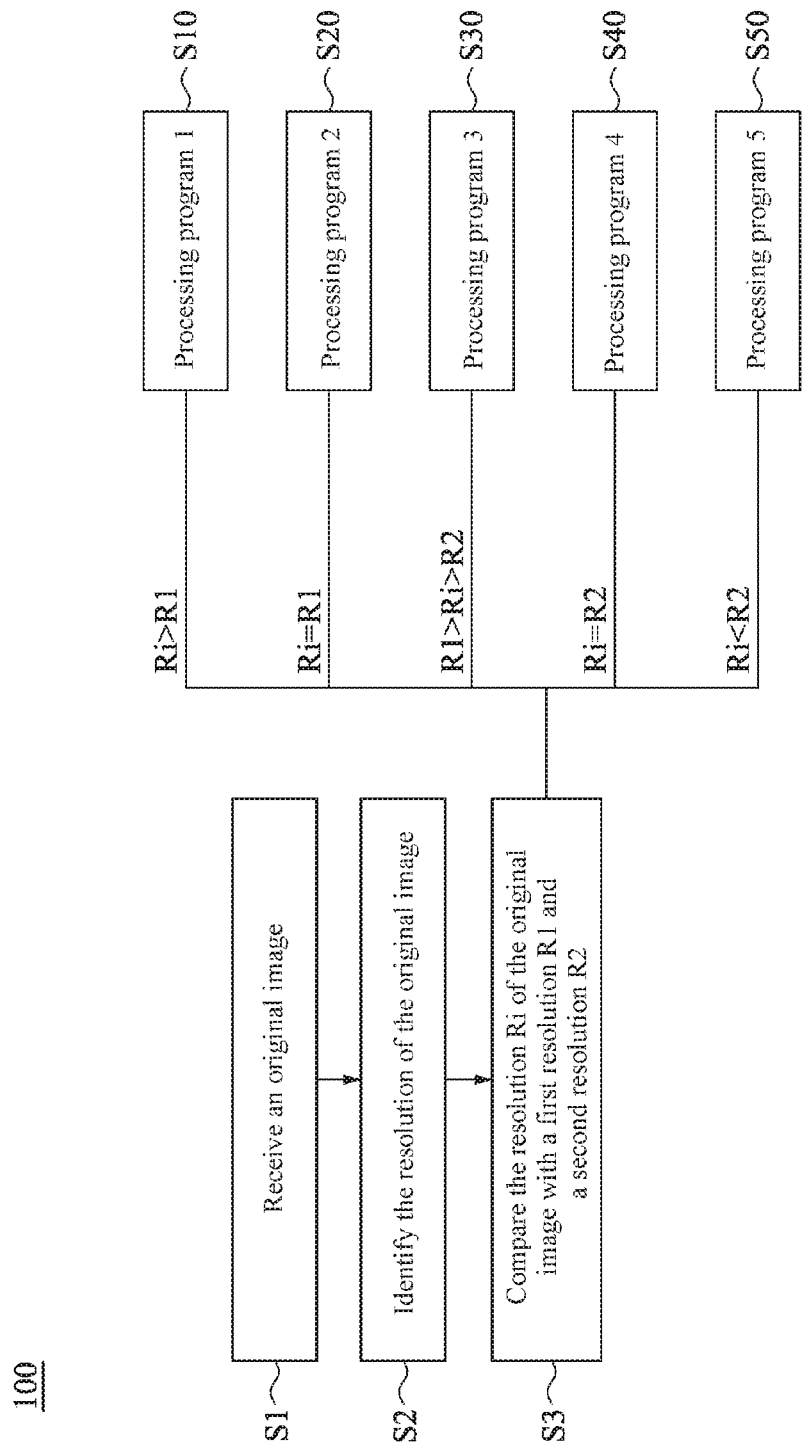
FIG. 1 is a flow diagram of a projection method according to an embodiment of the disclosure.

Please refer to FIG. 1. FIG. 1 is a flow diagram of a projection method 100 according to an embodiment of the disclosure. First, in step S1, an original image is received. In an embodiment, the original image comes from a computer, a game console, a DVD player, a Blu-ray player, or other similar electronic device. In an embodiment, the original image is received through an HDMI/DVI interface, a display port, a D-Sub interface or an AV synthesis/S-Video interface. In an embodiment, the original image includes a plurality of continuous frames to form a film. Due to the visual persistence of human eyes, these frames look like a film when the playing frequency of the frames is higher than 12 frames per second. Thus, the original image is a plurality of frames with a frame rate more than 12. In an embodiment, the frame rate of the original image is 120.

In step S2, the resolution of the original image is identified. In an embodiment, the resolution of the original image is identified by software or firmware stored in an image scaler of a projector.

In step S3, the identified resolution Ri of the original image is compared with a first resolution R1 and a second resolution R2 to generate a comparison result. In an embodiment, the first resolution R1 and the second resolution R2 are preset resolutions stored in the projector 300, and the first resolution R1 is higher than the second resolution R2. The first resolution R1 is a 4K resolution (3840×2160), that is, an amount of information including 3840×2160 pixels. The second resolution R2 is a full HD resolution (1920×1080), that is, an amount of information including 1920×1080 pixels. The second resolution R2 is the optimal resolution of the projector. That is to say, when the projector projects images with the second resolution R2, defects of the projected image are fewest. Therefore, no matter what the resolution of the original image is, the projector projects images having the second resolution R2 in the processing programs 1, 2, 3, 4 and 5 after step S3 to improve the image quality on the projection screen. The processing programs 1, 2, 3, 4 and 5 are detailed below.

When the comparison result in step S3 is that the resolution Ri of the original image is higher than the first resolution R1, the process proceeds to step S10, and the processing program 1 is executed. For detailed steps of the processing program 1, reference is made to FIG. 2. First, in step S11, a projection lens is determined to deflect in a projection process according to the comparison result that the resolution Ri of the original image is higher than the first resolution R1. In step S12, the resolution Ri (e.g., higher than 4K resolution) of the original image is reduced to the first resolution R1 (e.g., 4K resolution) according to the comparison result to generate a relay image with the first resolution R1. Next, in step S13, the relay image is processed to generate N frame images having the second resolution R2 (e.g., full HD resolution). Then, in step S14, the N frame images having the second resolution R2 are sequentially projected, and the projection lens is synchronously deflected to sequentially project the N frame images onto different positions of the projection screen, where N is a positive integer greater than 1.

Figure 7A:
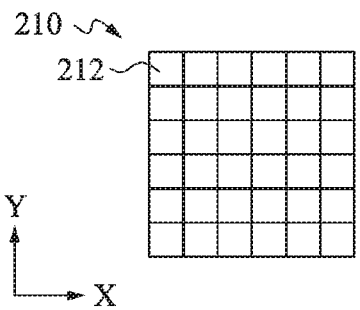
FIG. 7A is a schematic diagram of an image having a first resolution according to an embodiment of the disclosure.
Figure 7B:
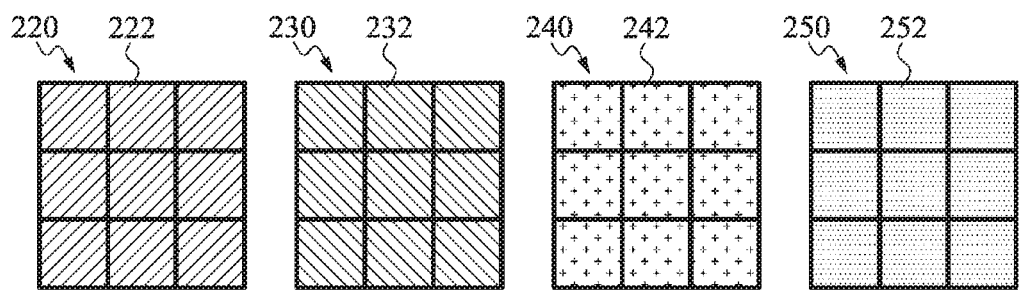
FIG. 7B is a schematic diagram of multiple frame images generated after the image in FIG. 7A is processed.
Figure 7C:
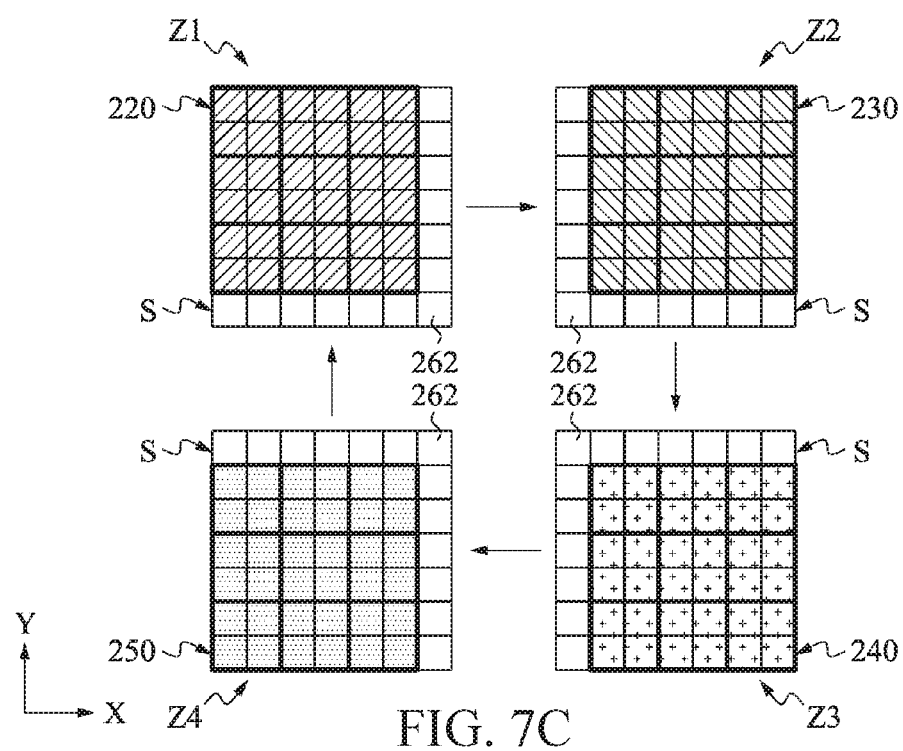
FIG. 7C is a schematic diagram of sequentially projecting the multiple frame images in FIG. 7B and synchronously deflecting a projection lens.

The embodiments in steps S13 to S14 refer to FIGS. 7A to 7C. FIG. 7A is a schematic diagram of an image 210 having the first resolution R1 (e.g., 4K resolution) according to an embodiment of the disclosure. The image 210 has a plurality of first pixels 212. FIG. 7B is a schematic diagram of four frame images 220, 230, 240 and 250 generated after the image 210 is processed. Each of the frame images 220, 230, 240 and 250 has the second resolution R2 (e.g., full HD resolution) which is lower than the first resolution R1. Specifically, the frame images 220, 230, 240 and 250 have a plurality of second pixels 222, 232, 242 and 252 respectively. Since the resolutions of the frame images 220, 230, 240 and 250 are lower than the resolution of the image 210, each of the second pixels 222, 232, 242 and 252 is larger than the first pixel 212 of the image 210. In an embodiment in which the first resolution R1 is a 4K resolution and the second resolution R2 is a full HD resolution, the size of each of the second pixels 222, 232, 242 and 252 in the X direction is about two times larger than that of the first pixel 212 in the X direction, and the size of each of the second pixels 222, 232, 242 and 252 in the Y direction is also about two times larger than that of the first pixel 212 in the Y direction.

FIG. 7C is a schematic diagram of sequentially projecting the frame images 220, 230, 240 and 250 and synchronously deflecting the projection lens according to an embodiment of the disclosure. As shown in FIG. 7C, the projection lens projects the frame image 220 to a first zone Z1 (e.g., upper left zone) of a projection screen S firstly. Then, the projection lens is deflected to project the frame image 230 to a second zone Z2 (e.g., upper right zone) different from the first zone in the projection screen S, and the offset between the first zone Z1 and the second zone Z2 substantially corresponds to the size of the first pixel 212 (see FIG. 7A) in the X direction. Next, the projection lens is deflected again to project the frame image 240 to a third zone Z3 (e.g., lower right zone) different from the first zone Z1 and the second zone Z2, where the offset between the second zone Z2 and the third zone Z3 substantially corresponds to the size of the first pixel 212 in the Y direction. Then, the projection lens is deflected again to project the frame image 250 to a fourth zone Z4 (e.g., lower left zone) different from the first, second and third zones Z1, Z2 and Z3, and the offset between the third zone Z3 and the fourth zone Z4 substantially corresponds to the size of the first pixel 212 in the X direction, and the offset direction is opposite to the offset direction from the first zone Z1 to the second zone Z2. Then, the lens is deflected back to the first zone Z1 to project next frame image 220, wherein the offset between the fourth zone Z4 and the first zone Z1 substantially corresponds to the size of the first pixel 212 in the Y direction, and the offset direction is opposite to that from the second zone Z2 to the second zone Z3.

When the switching frequency of the frame images 220, 230, 240 and 250 is higher than the frequency recognizable by human eyes (e.g., switching more than 12 times per second), the frame images 220, 230, 240 and 250 projected onto the projection screen S produce a visual perception similar to the original 4K image based on the visual persistence effect of human eyes. To facilitate more specific explanation, a plurality of imaginary pixels 262 is drawn on the projection screen S in FIG. 7C, and the size of these imaginary pixels 262 is the same as that of the first pixels 212 of the image 210. That is to say, these imaginary pixels 262 jointly constitute an image having the first resolution R1 (e.g., 4K resolution). When the frame images 220, 230, 240 and 250 are projected onto the projection screen S in the foregoing manner (i.e., the frame images 220, 230, 240 and 250 are sequentially projected with the imaginary pixels 262 as offsets), the human eyes feel the 4K image composed by these imaginary pixels 262 based on the visual persistence effect of the human eyes.

Figure 2:
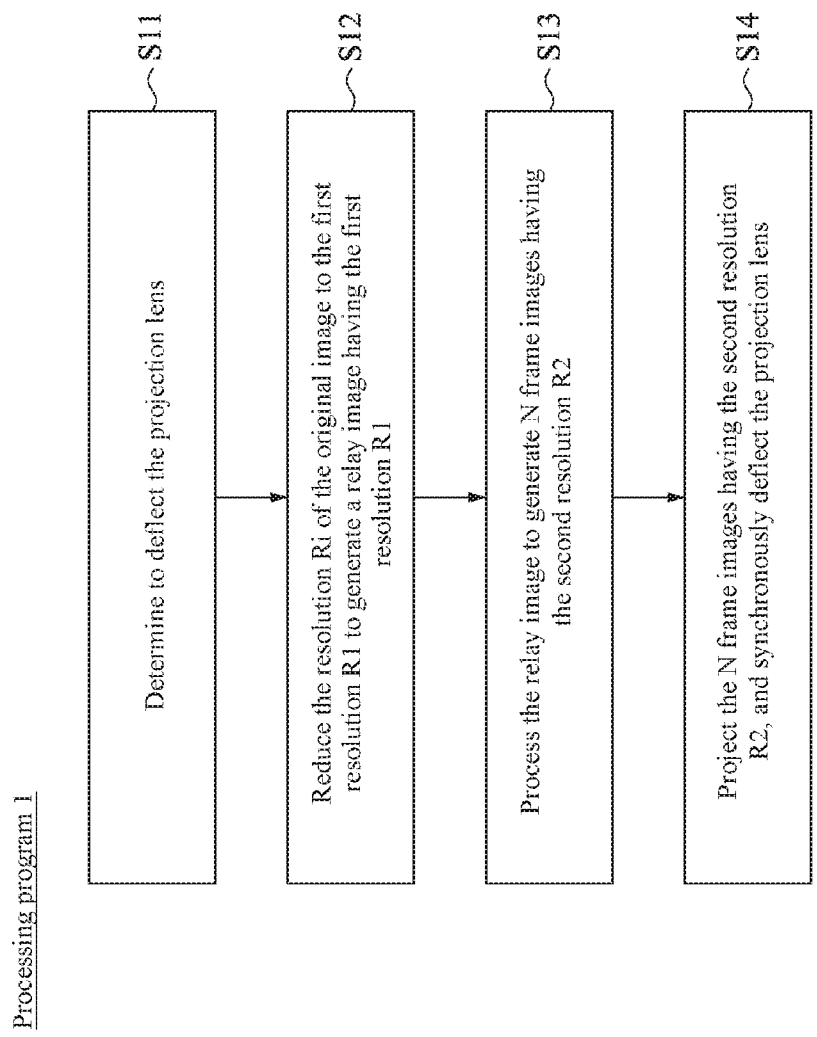
FIG. 2 is a flow diagram of a processing program 1 in FIG. 1.

Based on the above, in some embodiments, in step S12 of FIG. 2, the relay image generated by reducing the resolution of the original image to the first resolution R1 is the image 210 shown in FIG. 7A, the N frame images generated in step S13 are the frame images 220, 230, 240 and 250 shown in FIG. 7B, and the projection method in step S14 is the method of sequentially projecting the frame images 220, 230, 240 and 250 to different zones Z1, Z2, Z3 and Z4 as shown in FIG. 7C.

Figure 3:
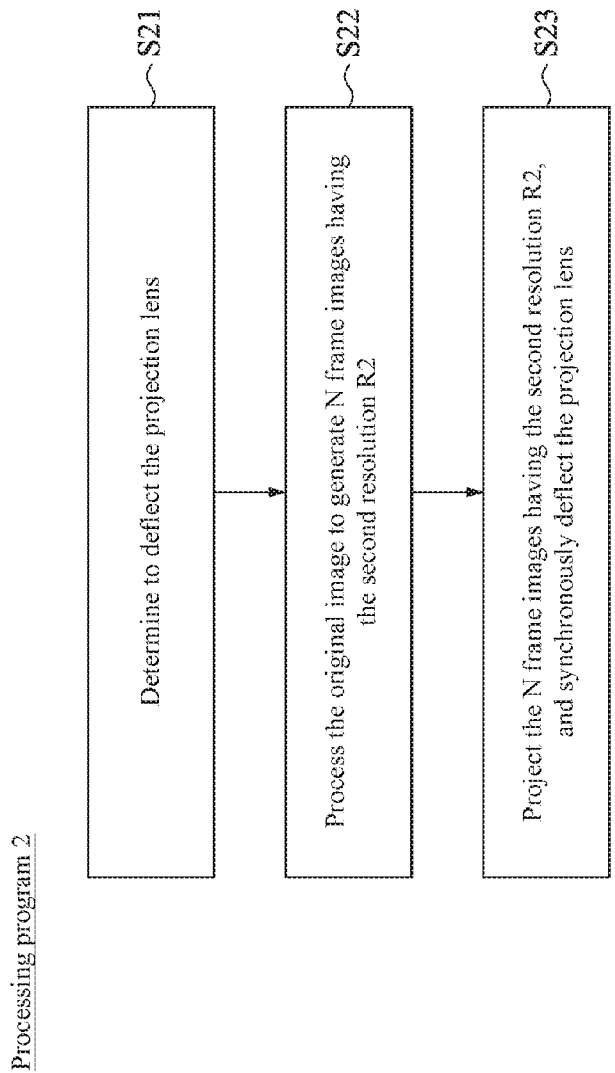
FIG. 3 is a flow diagram of a processing program 2 in FIG. 1.

Referring back to FIG. 1, when the comparison result in step S3 is that the resolution Ri of the original image is equal to the first resolution R1, the process proceeds to step S20, and the processing program 2 is executed. For detailed steps of the processing program 2, reference is made to FIG. 3. First, in step S21, the projection lens is determined to deflect in the projection process according to the comparison result that the resolution Ri of the original image is equal to the first resolution R1. In step S22, the original image having the first resolution R1 (e.g., 4K resolution) is processed to generate N frame images having the second resolution R2 (e.g., full HD resolution). Then, in step S23, N frame images having the second resolution R2 are sequentially projected, and the projection lens is synchronously deflected to sequentially project the N frame images onto different positions of the projection screen.

In some embodiments, the original image having the first resolution R1 is the image 210 shown in FIG. 7A, the N frame images generated in step S22 are the frame images 220, 230, 240 and 250 shown in FIG. 7B, and the projection method in step S23 is the method of sequentially projecting the frame images 220, 230, 240 and 250 to different zones Z1, Z2, Z3 and Z4 as shown in FIG. 7C.

Figure 4:
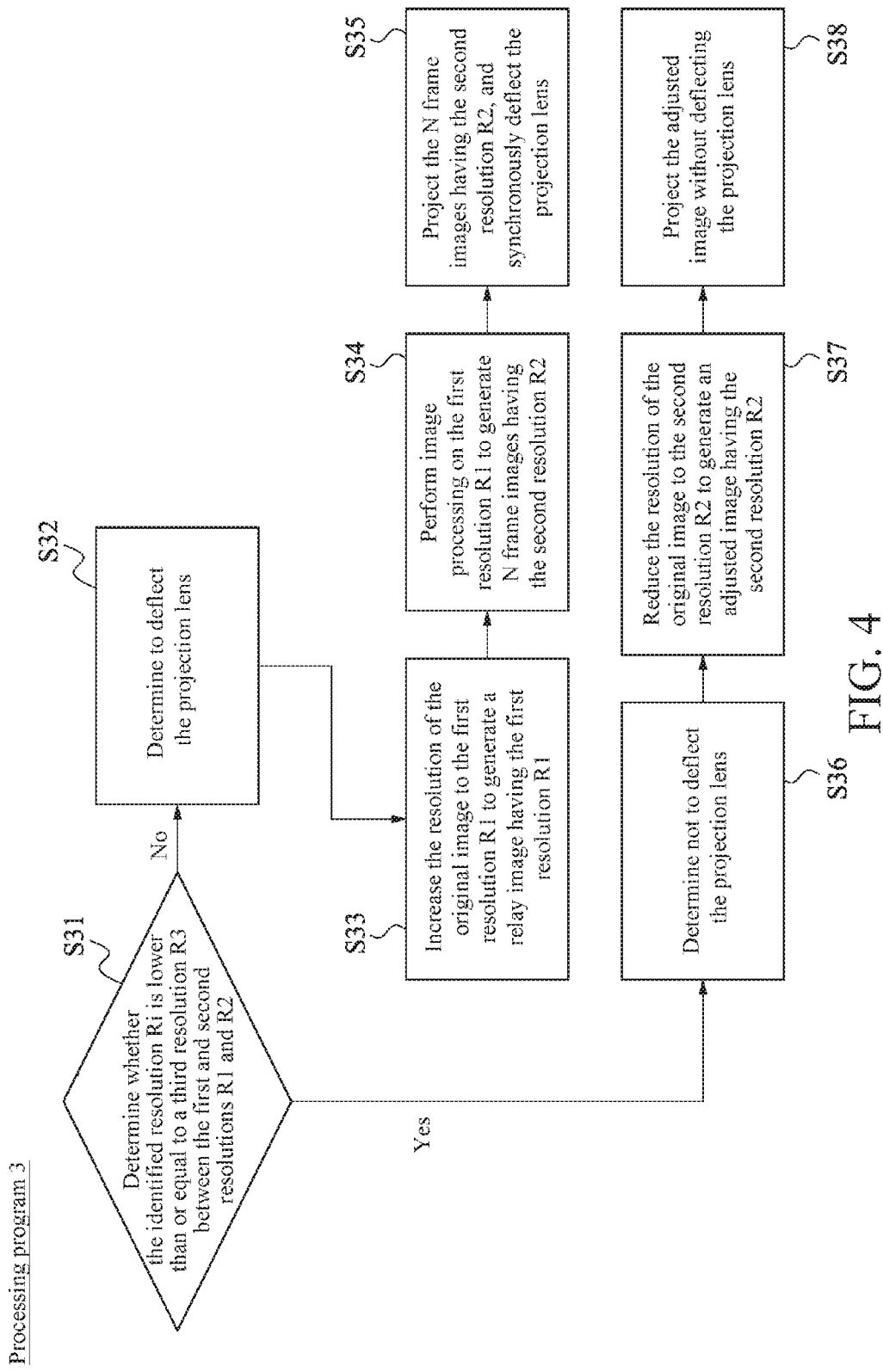
FIG. 4 is a flow diagram of a processing program 3 in FIG. 1.

Referring back to FIG. 1, when the comparison result in step S3 is that the resolution Ri of the original image is lower than the first resolution R1 and higher than the second resolution R2, the process proceeds to step S30, and the processing program 3 is executed. For detailed steps of the processing program 3, reference is made to FIG. 4. First, in step S31, it is determined whether the identified resolution Ri of the original image is lower than or equal to a third resolution R3. In an embodiment, the third resolution R3 is lower than the first resolution R1 and higher than the second resolution R2. In an embodiment, the third resolution R3 is an average value of the first resolution R1 and the second resolution R2, and is a preset resolution stored in the projector 300. In an embodiment, when the first resolution R1 is a 4K resolution (3840×2160) and the second resolution is a full HD resolution (1920×1080), the third resolution R3 is (2880×1620).

In step S31, when the identified resolution Ri of the original image is higher than the third resolution R3, the process proceeds to step S32, where it is determined that the projection lens is deflected in the projection process according to the comparison result that the resolution Ri of the original image is lower than the first resolution R1, higher than the second resolution R2 and higher than the third resolution R3. In step S33, the resolution Ri of the original image is increased to the first resolution R1 (e.g., 4K resolution) to generate a relay image having the first resolution R1. Next, in step S34, the relay image is processed to generate N frame images having the second resolution R2 (e.g., full HD resolution). Then, in step S35, the N frame images having the second resolution R2 are sequentially projected, and the projection lens is synchronously deflected to sequentially project the N frame images onto different positions of the projection screen.

In some embodiments, the relay image having the first resolution R1 in step S33 is the image 210 shown in FIG. 7A, the N frame images generated in step S34 are the frame images 220, 230, 240 and 250 shown in FIG. 7B, and the projection method in step S35 is the method of sequentially projecting the frame images 220, 230, 240 and 250 to different zones Z1, Z2, Z3 and Z4 as shown in FIG. 7C.

In step S31, when the identified resolution Ri of the original image is lower than or equal to the third resolution R3, the process proceeds to step S36, where it is determined that the projection lens is not deflected in the projection process. In step S37, the resolution Ri of the original image is reduced to the second resolution R2 (e.g., full HD resolution) to generate an adjusted image having the second resolution R2. Next, step S38 is performed to project the adjusted image without deflecting the projection lens. That is to say, under such condition, the resolution of the image does not need to be increased to the 4K resolution, so that the image quality defects such as distortion caused in the process of converting the original image into a 4K image are avoided, and the image also does not need to be projected by the pixel shift method special for the 4K image.

Figure 5:
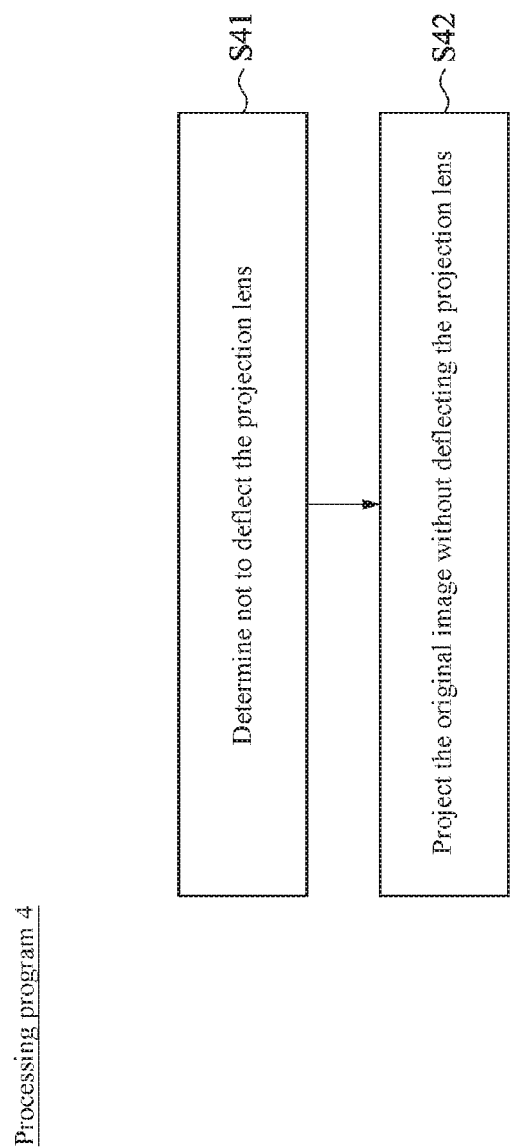
FIG. 5 is a flow diagram of a processing program 4 in FIG. 1.

Referring back to FIG. 1, when the comparison result in step S3 is that the resolution Ri of the original image is equal to the second resolution R2, the process proceeds to step S40, and the processing program 4 is executed. For detailed steps of the processing program 4, reference is made to FIG. 5. As shown in FIG. 5, in step S41, it is determined that the projection lens is not deflected in the projection process according to the comparison result that the resolution Ri of the original image is equal to the second resolution R2. In step S42, the original image is projected without deflecting the lens. That is to say, under such condition, the original image is directly projected without increasing the resolution to the 4K resolution, so that the image quality defects such as distortion caused in the process of converting the original image into a 4K image are avoided, and the image also does not need to be projected by the pixel shift method special for the 4K image.

Figure 6:
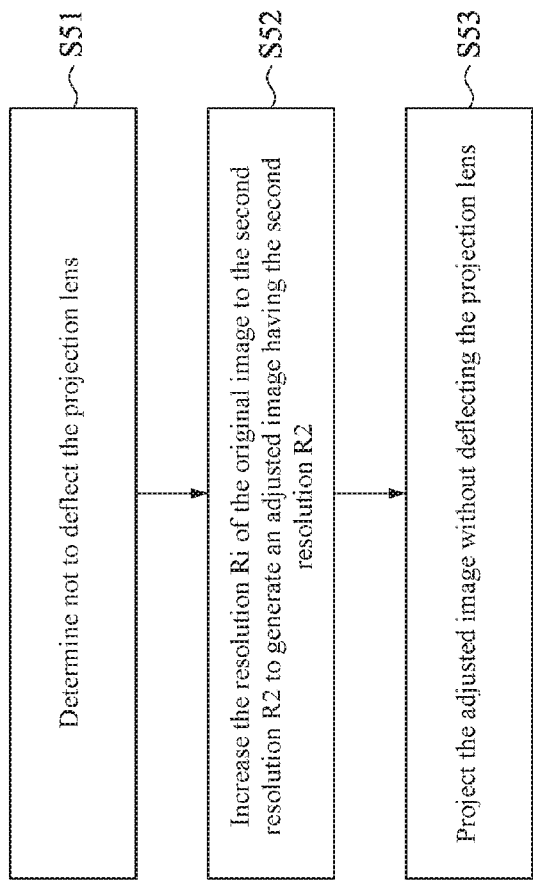
FIG. 6 is a flow diagram of a processing program 5 in FIG. 1.

Referring back to FIG. 1, when the comparison result in step S3 is that the resolution Ri of the original image is lower than the second resolution R2, the process proceeds to step S50, and the processing program 5 is executed. For detailed steps of the processing program 5, reference is made to FIG. 6. First, in step S51, it is determined that the projection lens is not deflected in the projection process according to the comparison result that the resolution Ri of the original image is lower than the second resolution R2. In step S52, the resolution Ri of the original image is increased to the second resolution R2 to generate an adjusted image having the second resolution R2. Next, in step S53, the adjusted image is projected without deflecting the lens. That is to say, under such condition, the resolution of the image does not need to be increased to the 4K resolution, so that the image quality defects such as distortion caused in the process of converting the original image into a 4K image are avoided, and the image also does not need to be projected by the pixel shift method special for the 4K image.

Figure 8:
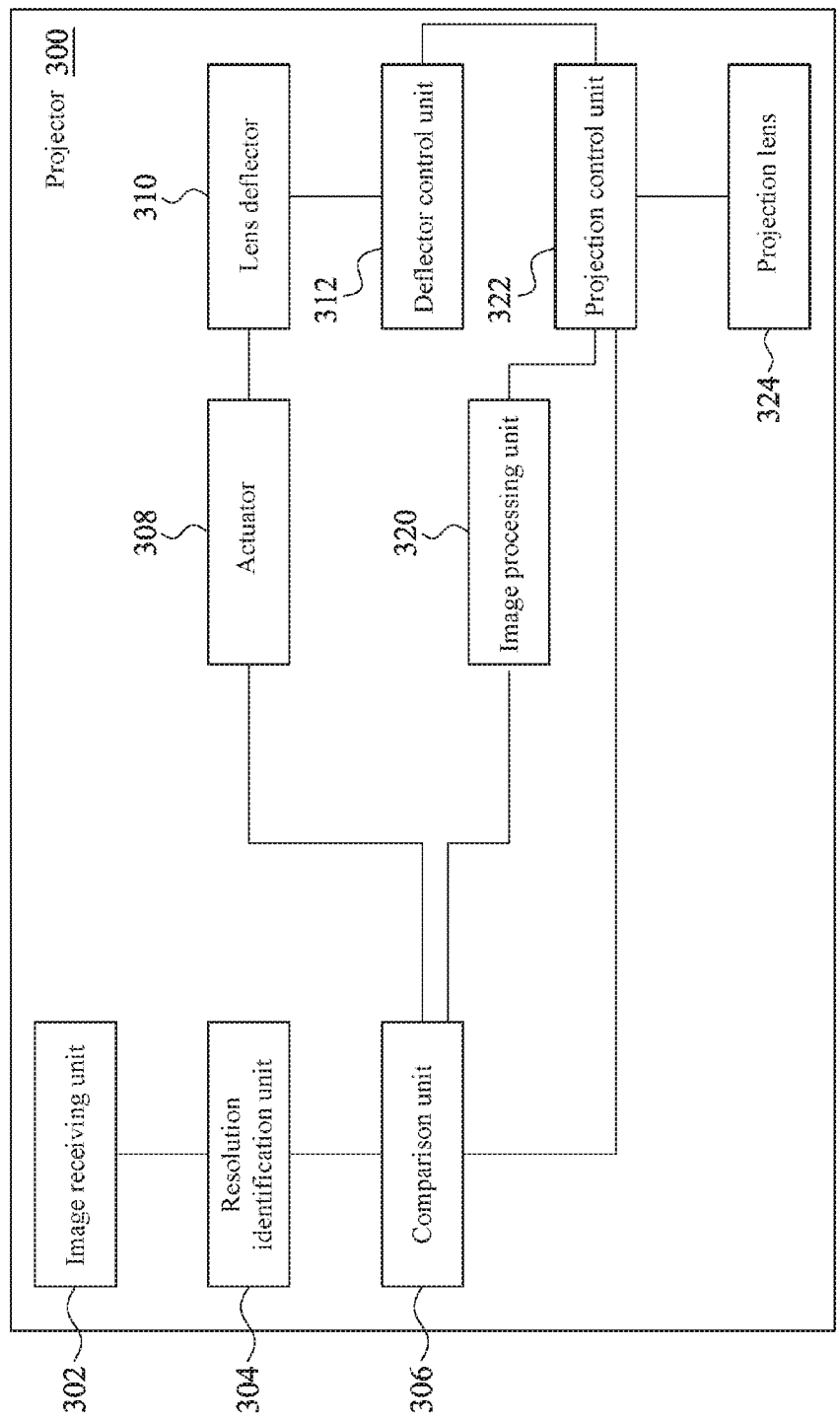
FIG. 8 is a system diagram of a projector according to an embodiment of the disclosure.

Please refer to FIG. 8. FIG. 8 is a system diagram of a projector 300 according to an embodiment of the disclosure. As shown in FIG. 8, the projector 300 comprises an image receiving unit 302, a resolution identification unit 304, a comparison unit 306, an actuator 308, a lens deflector 310, a deflector control unit 312, an image processing unit 320, a projection control unit 322 and a projection lens 324, where the lens deflector 310 is electrically connected with the projection lens 324. In some embodiments, the image receiving unit 302 is executed through at least one of an HDMI/DVI interface, a display port, a D-Sub interface or an AV synthesis/S-Video interface.

The resolution identification unit 304 is coupled to the image receiving unit 302 and configured to identify the resolution Ri of an original image. The comparison unit 306 is coupled to the resolution identification unit 304. In some embodiments, the comparison unit 306 is configured to compare the resolution Ri of the original image identified by the resolution identification unit 304 with a first resolution R1 (e.g., 4K resolution) and a second resolution R2 (e.g., full HD resolution). When the comparison unit 306 determines that the resolution Ri of the original image is higher than the first resolution R1, a first comparison result is generated and the aforementioned processing program 1 is executed. When the comparison unit 306 determines that the resolution Ri of the original image is equal to the first resolution R1, a second comparison result is generated and the aforementioned processing program 2 is executed. When the comparison unit 306 determines that the resolution Ri of the original image is lower than the first resolution R1 and higher than the second resolution R2, a third comparison result is generated and the aforementioned processing program 3 is executed. When the comparison unit 306 determines that the resolution Ri of the original image is equal to the second resolution R2, a fourth comparison result is generated and the aforementioned processing program 4 is executed. When the comparison unit 306 determines that the resolution Ri of the original image is lower than the second resolution R2, a fifth comparison result is generated and the aforementioned processing program 5 is executed.

In some embodiments, when the processing program 3 is executed, the comparison unit 306 further compares the resolution Ri of the original image with a third resolution R3 which is lower than the first resolution R1 and higher than the second resolution R2. When the comparison unit 306 determines that the resolution Ri of the original image is higher than the third resolution R3, a first advanced comparison result is generated, and step S32 and its subsequent steps in the processing program 3 are executed. When the comparison unit 306 determines that the resolution Ri of the original image is lower than or equal to the third resolution R3, a second advanced comparison result is generated, and step S36 and its subsequent steps in the processing program 3 are executed.

In some embodiments, the resolution identification unit 304 and the comparison unit 306 are implemented by software or firmware stored in an image scaler of the projector 300. In addition, the first resolution R1, the second resolution R2, and the third resolution R3 between the first and second resolutions R1 and R2 are different preset resolutions stored in the image scaler. Thus, in the image scaler, the comparison unit 306 compares the resolution Ri of the original image identified by the resolution identification unit 304 with at least one of the first resolution R1, the second resolution R2 or the third resolution R3.

In some embodiments, the image processing unit 320 is coupled to the comparison unit 306 and the projection control unit 322 to determine whether to process the original image (e.g., adjust the resolution) according to the comparison result generated by the comparison unit 306, and then the projection control unit 322 controls the projection lens 324 to project the corresponding image. In some embodiments, the image processing unit 320 and the projection control unit 322 are implemented by software, firmware or hardware in the projector 300.

When the comparison unit 306 generates the first comparison result to execute the processing program 1, the image processing unit 320 reduces the resolution Ri of the original image to the first resolution R1 according to the first comparison result to generate a relay image having the first resolution R1, and then the image processing unit 320 processes the relay image to generate N frame images having the second resolution R2, and provides the N frame images having the second resolution R2 to the projection control unit 322 for projection.

When the comparison unit 306 generates the second comparison result to execute the processing program 2, the image processing unit 320 processes the original image according to the second comparison result to generate N frame images having the second resolution R2, and provides the N frame images having the second resolution R2 to the projection control unit 322 for projection.

When the comparison unit 306 generates the third comparison result to execute the processing program 3, and then generates the first advanced comparison result to execute step S32 of the processing program 3, it is determined that the projection lens 324 is deflected in the projection process. Step S33 of the processing program 3 is executed according to the first advanced comparison result, where the image processing unit 320 increases the resolution Ri of the original image to the first resolution R1 to generate a relay image having the first resolution R1. Then, the image processing unit 320 processes the relay image to generate N frame images having the second resolution R2, and provides the N frame images having the second resolution R2 to the projection control unit 322 for projection.

When the comparison unit 306 generates the third comparison result to execute the processing program 3, and then generates the second advanced comparison result to execute step S36 of the processing program 3, it is determined that the projection lens 324 is not deflected in the projection process. Then, step S37 of the processing process 3 is executed according to the second advanced comparison result, where the image processing unit 320 reduces the resolution Ri of the original image to the second resolution R2 to generate an adjusted image having the second resolution R2, and provides the adjusted image having the second resolution R2 to the projection control unit 322 for projection.

When the comparison unit 306 generates the fourth comparison result to execute the processing program 4, the image processing unit 320 does not adjust the resolution Ri of the original image according to the fourth comparison result, and provides the original image to the projection control unit 322 for projection.

When the comparison unit 306 generates the fifth comparison result to execute the processing program 5, the image processing unit 320 increases the resolution Ri of the original image to the second resolution R2 according to the fifth comparison result to generate an adjusted image having the second resolution R2, and provides the adjusted image to the projection control unit 322 for projection.

The actuator 308 is coupled to the comparison unit 308 and the lens deflector 310. In some embodiments, the actuator 308 is configured to determine whether to actuate or not actuate the lens deflector 310 according to the comparison result of the comparison unit 307. In some embodiments, the actuator 308 is any type of device causing the lens deflector 310 to move according to an electrical signal, e.g., a motor or a piezoelectric device.

When the comparison unit 306 generates a comparison result such as the first or second comparison result or the first advanced comparison result in the third comparison result to execute the processing program 1, processing program 2 or step S35 in the processing program 3, the actuator 308 actuates the lens deflector 310 to deflect the projection lens 324 disposed on the lens deflector 310.

In contrast, when the comparison unit 306 generates a comparison result such as the fourth comparison result, fifth comparison result or the second advanced comparison result in the third comparison result to execute the processing program 4, processing program 5 or step S38 in the processing program 3, the actuator 308 does not actuate the lens deflector 310, so that the projection lens 324 is kept stationary during projection.

In some embodiments, the deflector control unit 312 is coupled to the lens deflector 310 and the projection control unit 322. When the lens deflector 310 is actuated, the deflector control unit 312 controls the lens deflector 310 to sequentially deflect the projection lens 324. In some embodiments, the deflector control unit 312 is coupled to the projection control unit 322, so that the deflector control unit 312 causes the deflection sequence (or frequency) of the projection lens 324 to be substantially synchronous with the projection sequence (or frequency) of the N frame images controlled by the projection control unit 322. In some embodiments, the deflector control unit 312 is executed by software, firmware or hardware in the projector 300.

Although the disclosure discloses the projection method as a series of steps, the order of these steps is not construed as limiting. In addition, not all of the steps shown here are essential to the one or more patterns or embodiments described herein. Moreover, one or more steps of the disclosure are performed in one or more separate steps and/or stages.

In summary, the projection method of the disclosure firstly identifies the resolution of the original image, and determines whether to project images by the pixel shift method based on the resolution. Therefore, when the resolution of the original image satisfies certain condition (e.g., lower than or equal to the preset resolution), the projector does not project the image by means of pixel shift special for the 4K image, thereby avoiding possible image quality defects such as distortion caused in the process of converting the original image into the 4K image, so as to improve the watching quality for a user.

Although the disclosure is described with reference to the above embodiments, the embodiments are not intended to limit the disclosure. Any person skilled in the art may make variations and improvements without departing from the spirit and scope of the disclosure. Therefore, the protection scope of the disclosure should be subject to the appended claims.

What is claimed is:

1. A projection method, comprising:
    identifying the resolution of an original image;
    comparing the resolution of the original image with a preset resolution to generate a comparison result;
    determining whether to deflect a projection lens in a projection process according to the comparison result; and
    projecting at least one image in the projection process according to the comparison result.

2. The projection method according to claim 1, wherein the preset resolution includes a first resolution and a second resolution, and the first resolution is higher than the second resolution.

3. The projection method according to claim 2, wherein when the comparison result is that the resolution of the original image is lower than the second resolution, the projection lens is not deflected in the projection process, and the step of projecting at least one image in the projection process according to the comparison result further comprises:
    increasing the resolution of the original image to generate an adjusted image; and
    projecting the adjusted image.

4. The projection method according to claim 2, wherein when the comparison result is that the resolution of the original image is equal to the second resolution, the projection lens is not deflected in the projection process, and the original image is projected.

5. The projection method according to claim 2, wherein when the comparison result is that the resolution of the original image is higher than the second resolution, lower than the first resolution and lower than an average value of the first resolution and the second resolution, the projection lens is not deflected in the projection process, and the step of projecting at least one image in the projection process according to the comparison result further comprises:
    reducing the resolution of the original image to generate an adjusted image; and
    projecting the adjusted image.

6. The projection method according to claim 1, wherein when the comparison result is that the resolution of the original image is equal to the first resolution, the projection lens is deflected in the projection process, and the step of projecting at least one image in the projection process according to the comparison result further comprises:
    converting the original image into N frame images, wherein the resolutions of the frame images are lower than the resolution of the original image, and N is a positive integer greater than 1; and
    sequentially projecting the frame images and simultaneously deflecting the projection lens.

7. The projection method according to claim 1, wherein when the comparison result is that the resolution of the original image is higher than the first resolution, the projection lens is deflected in the projection process, and the step of projecting at least one image in the projection process according to the comparison result further comprises:
    reducing the resolution of the original image to generate a relay image;
    converting the relay image into N frame images, wherein the resolutions of the frame images are lower than the resolution of the relay image, and N is a positive integer greater than 1; and
    sequentially projecting the frame images and simultaneously deflecting the projection lens.

8. The projection method according to claim 2, wherein when the comparison result is that the resolution of the original image is lower than the first resolution, higher than the second resolution and higher than an average value of the first resolution and the second resolution, the projection lens is deflected in the projection process, and the step of projecting at least one image in the projection process according to the comparison result further comprises:
    increasing the resolution of the original image to generate a relay image;
    converting the relay image into N frame images, wherein the resolutions of the frame images are lower than the resolution of the relay image, and N is a positive integer greater than 1; and
    sequentially projecting the frame images and simultaneously deflecting the projection lens.

9. A projector, comprising:
    a projection lens;
    a lens deflector, electrically connected with the projection lens and configured to deflect the projection lens;
    a resolution identification unit, configured to identify the resolution of an original image;
    a comparison unit, coupled to the resolution identification unit and configured to compare the resolution of the original image with a preset resolution to generate a comparison result; and an actuator, coupled to the lens deflector and configured to actuate the lens deflector when the comparison unit determines that the resolution of the original image is higher than the preset resolution, and the actuator does not actuate the lens deflector when the comparison unit determines that the resolution of the original image is lower than or equal to the preset resolution.

10. The projector according to claim 9, further comprising:

an image processing unit, configured to change the resolution of the original image to generate an adjusted image, wherein the projection lens is configured to project the adjusted image when the lens deflector is not actuated.

11. The projector according to claim 9, further comprising:

an image processing unit, configured to change the resolution of the original image to generate a relay image, and convert the relay image into N frame images, wherein the resolutions of the frame images is lower than the resolution of the relay image, N is a positive integer greater than 1, and the projection lens is configured to sequentially project the frame images when the lens deflector is actuated.

* * * * *